US012605031B2

(12) United States Patent
Libman et al.

(10) Patent No.: US 12,605,031 B2
(45) Date of Patent: *Apr. 21, 2026

(54) MOP SYSTEM WITH ROTATING MOP HEAD

(71) Applicant: The Libman Company, Arcola, IL (US)

(72) Inventors: Andrew D. Libman, Champaign, IL (US); Aaron Libman, Champaign, IL (US); Jon Franklin, St. Joseph, IL (US); Marco Bizzotto, Padua (IT); Carlos Aguiar, Burgo (PT); Fernando de Jesus Santos, Maceira LRA (PT)

(73) Assignee: The Libman Company, Arcola, IL (US)

( * ) Notice: Subject to any disclaimer, the term of this patent is extended or adjusted under 35 U.S.C. 154(b) by 362 days.

This patent is subject to a terminal disclaimer.

(21) Appl. No.: 18/210,905

(22) Filed: Jun. 16, 2023

(65) Prior Publication Data

US 2023/0404354 A1 Dec. 21, 2023

Related U.S. Application Data

(63) Continuation of application No. 17/235,679, filed on Apr. 20, 2021, now Pat. No. 11,717,130.

(51) Int. Cl.
*A47L 13/58* (2006.01)
*A47L 13/254* (2006.01)
*B25G 1/04* (2006.01)

(52) U.S. Cl.
CPC ............. *A47L 13/58* (2013.01); *A47L 13/254* (2013.01); *B25G 1/04* (2013.01)

(58) Field of Classification Search
CPC ...... A47L 13/58; A47L 13/254; A47L 13/256; A47L 13/255; A47L 13/14; A47L 13/20; A47L 13/142
(Continued)

(56) References Cited

U.S. PATENT DOCUMENTS 1,722,130 A 7/1929 Finstad
1,882,918 A 10/1932 Robb
(Continued)

FOREIGN PATENT DOCUMENTS

CN 1845696 A 10/2006
CN 101884516 A 11/2010
(Continued)

OTHER PUBLICATIONS

Jul. 27, 2024—(CN) Office Action—App. No. 202210395588X.
(Continued)

*Primary Examiner* — Brian D Keller
*Assistant Examiner* — Jason Khalil Hawkins
(74) *Attorney, Agent, or Firm* — Banner & Witcoff, Ltd.

(57) ABSTRACT

A spin mop and bucket system to assist in dewatering a mop is disclosed. The spin mop may have a handle assembly slidably connected with a spiral member, and a mop head that is attached to the spiral member. When the handle assembly moves along the spiral member, the spiral member rotates causing the mop head to rotate. The mop head may articulate relative to the handle assembly and may be pivotally connected to the spiral member and also pivotally connected to a swivel member located between the spiral member and a mop head base. The mop head may be received in a wringer basket of a bucket assembly, such that when the mop head spins, the wringer basket spins to expel any excess fluid from the mop head.

18 Claims, 11 Drawing Sheets

(58) Field of Classification Search
USPC ........................................................ 15/260
See application file for complete search history.

(56) References Cited

U.S. PATENT DOCUMENTS

| | | | |
|---|---|---|---|
| 3,040,356 | A | 6/1962 | Vosbikian |
| D216,277 | S | 12/1969 | James |
| D227,148 | S | 6/1973 | Oas |
| D344,379 | S | 2/1994 | Clark, Jr. |
| D345,236 | S | 3/1994 | Chen |
| 5,414,892 | A | 5/1995 | Clark, Jr. |
| D417,935 | S | 12/1999 | Primeau |
| D482,530 | S | 11/2003 | Evans |
| D557,472 | S | 12/2007 | Renner |
| 7,318,247 | B2 | 1/2008 | Libman et al. |
| D603,115 | S | 10/2009 | McNeil et al. |
| 8,132,287 | B2 | 3/2012 | Ting |
| 8,214,963 | B2 | 7/2012 | Yu |
| 8,220,101 | B2 | 7/2012 | Chen |
| 8,225,454 | B2 | 7/2012 | Yang et al. |
| 8,291,538 | B2 | 10/2012 | Yang et al. |
| 8,291,544 | B2 | 10/2012 | Chen et al. |
| 8,316,502 | B2 | 11/2012 | Shao |
| 8,327,502 | B2 | 12/2012 | Tsai |
| 8,336,160 | B2 | 12/2012 | Chen |
| 8,365,341 | B2 * | 2/2013 | Lin ........................ A47L 13/58 15/228 |
| 8,407,845 | B2 | 4/2013 | Yu |
| 8,522,387 | B2 | 9/2013 | Chen |
| 8,544,133 | B2 | 10/2013 | Fischer et al. |
| D693,080 | S | 11/2013 | Shao |
| D694,978 | S | 12/2013 | Libman |
| D707,003 | S | 6/2014 | Dingert |
| 8,793,834 | B2 * | 8/2014 | Lee ...................... A47L 13/258 15/260 |
| 8,819,890 | B2 | 9/2014 | Lin |
| 8,826,486 | B2 | 9/2014 | Lee |
| 8,826,487 | B2 | 9/2014 | Lee |
| 8,925,139 | B2 | 1/2015 | Shih |
| 8,959,697 | B2 | 2/2015 | Yu |
| D723,758 | S | 3/2015 | Lentine |
| 8,974,194 | B2 | 3/2015 | Yin et al. |
| 8,978,194 | B1 | 3/2015 | Lentine |
| D727,580 | S | 4/2015 | Lentine |
| 8,997,305 | B1 | 4/2015 | Lentine |
| D728,882 | S | 5/2015 | Tsai |
| 9,021,648 | B1 | 5/2015 | Chu |
| 9,032,579 | B1 | 5/2015 | Chen |
| D789,638 | S | 6/2017 | Rueckheim |
| 9,730,568 | B2 | 8/2017 | Lentine |
| D804,125 | S | 11/2017 | Rueckheim |
| D819,906 | S | 6/2018 | Beyda et al. |
| D849,347 | S | 5/2019 | Hekking |
| D853,670 | S | 7/2019 | Hu |
| D865,309 | S | 10/2019 | Zheng |
| D875,339 | S | 2/2020 | Tullney |
| D903,211 | S | 11/2020 | Gao |
| D925,850 | S | 7/2021 | Tullney |
| D927,195 | S | 8/2021 | Wei |
| D935,719 | S | 11/2021 | Huang |
| D936,303 | S | 11/2021 | Jiang |
| D936,304 | S | 11/2021 | Jiang |
| 2007/0107153 | A1 * | 5/2007 | Gullicks ............... A47L 13/258 15/228 |
| 2007/0226929 | A1 | 10/2007 | Kao |
| 2010/0180460 | A1 | 7/2010 | Tang |
| 2011/0225752 | A1 | 9/2011 | Yu |
| 2011/0247163 | A1 | 10/2011 | Chen |
| 2011/0271472 | A1 | 11/2011 | Yang et al. |
| 2011/0271475 | A1 | 11/2011 | Yang et al. |
| 2011/0274481 | A1 | 11/2011 | Chen |
| 2012/0047675 | A1 | 3/2012 | Chu |
| 2015/0128373 | A1 | 5/2015 | Lin |
| 2016/0206171 | A1 | 7/2016 | Metzel et al. |
| 2016/0316984 | A1 | 11/2016 | Zhu |
| 2018/0344125 | A1 | 12/2018 | Chen et al. |
| 2019/0390852 | A1 | 12/2019 | Sigurdson |
| 2021/0186295 | A1 | 6/2021 | Ross |

FOREIGN PATENT DOCUMENTS

| | | | |
|---|---|---|---|
| CN | 304828473 | | 9/2018 |
| EP | 2255712 | A2 | 12/2010 |
| WO | 2013052439 | A2 | 4/2013 |
| WO | 2013151784 | A1 | 10/2013 |
| WO | 2015010577 | A1 | 1/2015 |

OTHER PUBLICATIONS

LEIFHEIT Clean Twist Disc Ergo Mop and Bucket Set, retrieved from https://www.leifheit.co.uk/leifheit--clean-twist-disc-ergo-mop-and-bucket-set-935-p.asp on Apr. 15, 2022.

YouTube, Video of Libman Spin Mop & Bucket, retrieved on May 9, 2022 from <https://www.youtube.com/watch?v=c2hE-oy5s98>.

Amazon.com_ Spin Mop https://www.amazon.com/Masthome-Wringer-Microfiber-Household-Stai nless/dp/B076JC6TTP/ref=sr <http://www.amazon.com/Masthome-Wringer-Microfiber-Household-Stainless/dp/B076JC6TTP/ref%3Dsr>_1_30_sspa (Year: 2018).

Amazon.com_ Libman All-In- One Microfiber Spin Mop https://www.amazon.com/Libman-Bucket-Green-White-Spin/dp/B072Z6VTP2/ref=sr <http://www.amazon.com/Libman-Bucket-Green-White-Spin/dp/B072Z6VTP2/ref%3Dsr_1_2>_1_2 (Year: 2018).

Homedepot.com Libman Microfiber Tornado Wet Spin Mop and Bucket https://www.homedepot.com/p/Li <http://www.homedepot.com/p/Libman-Microfiber-Tornado-Wet-Spin-Mop-and-Bucket-Floor-Cleaning-System-with-2-Refills-1566/ >bman-Microfiber-Tornado-Wet-Spin-Mop-and-Bucket-Floor-Clean <http://www.homedepot.com/p/Libman-Microfiber-Tornado-Wet-Spin-Mop-and-Bucket-Floor-Cleaning-System-with-2-Refills-1566/>ing-System-with-2-Refills-1566/ <http://www.homedepot.com/p/Libman-Microfiber-Tornado-Wet-Spin-Mop-and-Bucket-Floor-Cleaning-System-with-2-.

* cited by examiner

MOP SYSTEM WITH ROTATING MOP HEAD

CROSS-REFERENCE TO RELATED APPLICATIONS

This application is a continuation of U.S. patent application Ser. No. 17/235,679, filed on Apr. 20, 2021, which is herein incorporated by reference in its entirety.

TECHNICAL FIELD

Aspects described herein generally relate to a mop with a rotatable mop head, in particular a mop system with a mop that has a rotatable head that engages a rotatable wringer basket on a bucket to dewater a mop.

BACKGROUND

Mops are used for cleaning all types of surfaces. However, once a mop has been used to clean a surface, the mop head may be dirty and need to be cleaned off prior to applying the mop onto the surface. The mop head may be cleaned by placing the dirty mop into a liquid or water within a bucket and then removing any excess liquid or water from the mop prior to applying it to the surface. A simple means to dewater the mop head is desired.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

Aspects of the disclosure may relate to a mop system that utilizes a mop with a rotating or spinning mop head that engages a wringer basket on a bucket assembly to provide a simple process to dewater a mop.

Additional aspects of this disclosure may relate to a spin mop structure that includes a handle assembly having a handle grip and a handle tube slidably engaged with a spiral member; the handle assembly defining a handle longitudinal axis, where the spiral member has a first end with an engaging member, a second end opposite the first end, and a central spiraled portion positioned between the first end and the second end that has a spiraled surface. The mop structure may also include a swivel member pivotally attached to the engaging member of the spiral member along a first swivel axis; and a mop base configured to releasably secure a mop head, where the mop base is pivotally attached to the swivel member along a second swivel axis. The first swivel axis and the second swivel axis may be unaligned. A movement of the handle assembly sliding along the spiral member may cause the mop head to rotate. The engaging member may have a first boss and a second boss opposite the first boss, where the first boss may be received in a first opening of the swivel member and the second boss may be received in a second opening of the swivel member. The first boss and the second boss may be arranged along the first swivel axis. The swivel member may have a central aperture that receives the engaging member. The swivel member may have a first swivel boss and a second swivel boss, where the first swivel boss may be received in a first opening of the mop base and the second swivel boss is received in second opening of the mop base, where the first swivel boss and the second swivel boss may be arranged along the second swivel axis. The swivel member may include a top surface, a bottom surface, and a perimeter surface extending between the top surface and the bottom surface, where the perimeter surface of the swivel member may have a convex shape between the top surface and the bottom surface. The swivel member may comprise a generally oval shape. The first swivel axis may be generally perpendicular to the handle longitudinal axis.

Still other aspects of this disclosure may relate to a spin mop system that includes: (a) a bucket assembly comprising: (1) a bucket including a top wall, a bottom wall, and a sidewall extending between the top wall and the bottom wall, an axle member connected to the bottom wall, and a shelf positioned below the top wall; the axle member defining an axle axis; (2) a wringer basket rotatably engaged with the bucket along the axle axis, the wringer basket including a bottom wall, a perimeter wall extending upward from the bottom wall, a recess in the bottom wall that receives the axle member, and a plurality of wringer basket tabs extending inward from the perimeter wall, where the perimeter wall and the bottom wall have a plurality of openings that allow a liquid to pass through the plurality of openings; and (3) a cover secured to the shelf, wherein the cover includes a top surface, a central opening that is located over the wringer basket, and a splashguard that extends downward from the top surface; and (b) a spin mop structure comprising: (1) a handle assembly having a handle grip and a handle tube slidably engaged with a spiral member; the handle assembly defining a handle longitudinal axis, where the spiral member having a first end with an engaging member, a second end opposite the first end, and a central spiraled portion between the first end and the second end having a spiraled surface; and (3) a mop base configured to releasably secure a mop head, where the mop base connected to the spiral member, the mop base including a lower outward facing surface that contacts one of the plurality of wringer basket tabs. When the mop base is received in the wringer basket of the bucket assembly, a movement of the handle assembly sliding along the spiral member may cause the mop head to spin and also may cause the wringer basket to rotate about the axle axis. The splashguard of the cover may extend downward more than 50 percent of a height of the bucket assembly, where the height of the bucket assembly is defined as a distance from a bottom surface of the bottom wall to a top surface of the top wall. The spin mop structure may further include a swivel member pivotally attached to the engaging member of the spiral member along a first swivel axis. The mop base pivotally may be attached to the swivel member along a second swivel axis, where the first swivel axis and the second swivel axis may be generally perpendicular to each other. When the handle assembly is pivotally rotated about the first swivel axis to a first angle within a first angle range of 0 degrees and 45 degrees from the axle axis and the handle assembly is also pivotally rotated about the second swivel axis to a second angle within a second angle range of 0 degrees and 45 degrees, the movement of the handle assembly sliding along the spiral member causes the wringer basket to rotate. The mop base may include a recess in the top surface that receives the swivel member, where the recess has a curved concave shaped surface. The bucket may have an elongated shape that includes a length that is greater than a width, where the length extends from a first side to a second side opposite the first side, and the width extends from a third side to a fourth side opposite the third side, where the wringer basket is nearer the first side than the second side. The bucket may include a pour spout positioned within the sidewall nearer the second side than the first side. The splashguard of the cover may be asymmetrical with respect to a plane that extends through the axle axis and a centerline of the bucket may extend in a direction from a center of the first side to a center of the second side. The splashguard may include a central region that has a curved shape that is coaxial with the axle axis, a first end region extending from the central region towards the second side of the bucket, and a second end region extending from the central region towards the second side opposite the first end region, where the first end region extends closer to the second side than the second end region.

Yet other aspects of this disclosure may relate to a spin mop system comprising: (a) a bucket assembly that includes: (1) a bucket including a top wall, a bottom wall, and a side wall extending between the top wall and the bottom wall, an axle member connected to the bottom wall, and a shelf positioned below the top wall; the axle member defining an axle axis, where the bucket has an elongated shape that includes a length that is greater than a width, where the length extends from a first side to a second side opposite the first side, and the width extends from a third side to a fourth side opposite the third side, (2) a wringer basket rotatably engaged with the bucket along the axle axis, the wringer basket including a bottom wall, a perimeter wall extending upward from the bottom wall, a recess in the bottom wall that receives the axle member, and a plurality of wringer basket tabs extending inward from the perimeter wall, wherein the perimeter wall and the bottom wall have a plurality of openings that allow a liquid to pass through the plurality of openings; wherein the wringer basket is nearer the first side than the second side; and (3) a cover secured to the shelf, wherein the cover includes a top surface, a central opening that is located over the wringer basket, and a splashguard that extends downward from the top surface; and (b) a spin mop structure comprising: (1) a handle assembly having a handle grip and a handle tube slidably engaged with a spiral member; the handle assembly defining a handle longitudinal axis, where the spiral member having a first end with an engaging member, a second end opposite the first end, and a central spiraled portion between the first end and the second end having a spiraled surface; (2) a swivel member pivotally attached to the engaging member of the spiral member along a first swivel axis; and (3) a mop base configured to releasably secure a mop head, where the mop base is pivotally attached to the swivel member along a second swivel axis, and where the first swivel axis and the second swivel axis are generally perpendicular to each other. When the mop base is received in the wringer basket of the bucket assembly, a movement of the handle assembly sliding along the spiral member may cause the mop head to spin and may also cause the wringer basket to rotate about the axle axis. The splashguard may include a central region that has a curved shape that is coaxial with the axle axis, a first end region extending from the central region towards the second side of the bucket, and a second end region extending from the central region towards the second side opposite the first end region, wherein the first end region extends closer to the second side than the second end region. The engaging member may have a first boss and a second boss opposite the first boss. The first boss may be received in a first opening of the swivel member, and the second boss is received in a second opening of the swivel member. The first boss and the second boss are arranged along the first swivel axis.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative arrangements, reference is made to the accompanying drawings, which form a part hereof, and in which is shown, by way of illustration, various arrangements in which aspects of the disclosure may be practiced. It is to be understood that other arrangements may be utilized and structural and functional modifications may be made, without departing from the scope of the present disclosure. It is noted that the accompanying drawings may not be drawn to scale. It is noted that various connections between elements are discussed in the following description. It is noted that these connections are general and, unless specified otherwise, may be direct or indirect, and that the specification is not intended to be limiting in this respect.

The following terms are used in this specification, and unless otherwise noted or clear from the context, these terms have the meanings provided below.

"Plurality," as used herein, indicates any number greater than one, either disjunctively or conjunctively, as necessary, up to an infinite number.

"Generally perpendicular" means that a first line, segment, plane, edge, surface, etc. is approximately (in this instance, within 5%) orthogonal with another line, plane, edge, surface, etc., over at least 50% of the length of the first line, segment, plane, edge, surface, etc.

"Generally planar" means that a surface is level and aligned with another surface, such that the two surfaces form a substantially flat single surface, within a tolerance of +/−0.05 inches.

In general, this disclosure relates to a mop system comprising a spin mop and a bucket assembly where the spin mop engages the bucket assembly to assist in dewatering the mop. In short, when the mop head engages a wringer basket of a bucket assembly, the spinning of the mop head may cause the wringer basket to spin with it, which causes excess water to be forced from the yarns of the mop head. Therefore, dewatering the mop head and preparing it for use. The mop head may be configured to pivot along two different axes to allow a movement of the handle assembly to drive the rotation of the wringer basket even when the handle assembly is arranged at different angles relative to the mop head.

Figure 1:
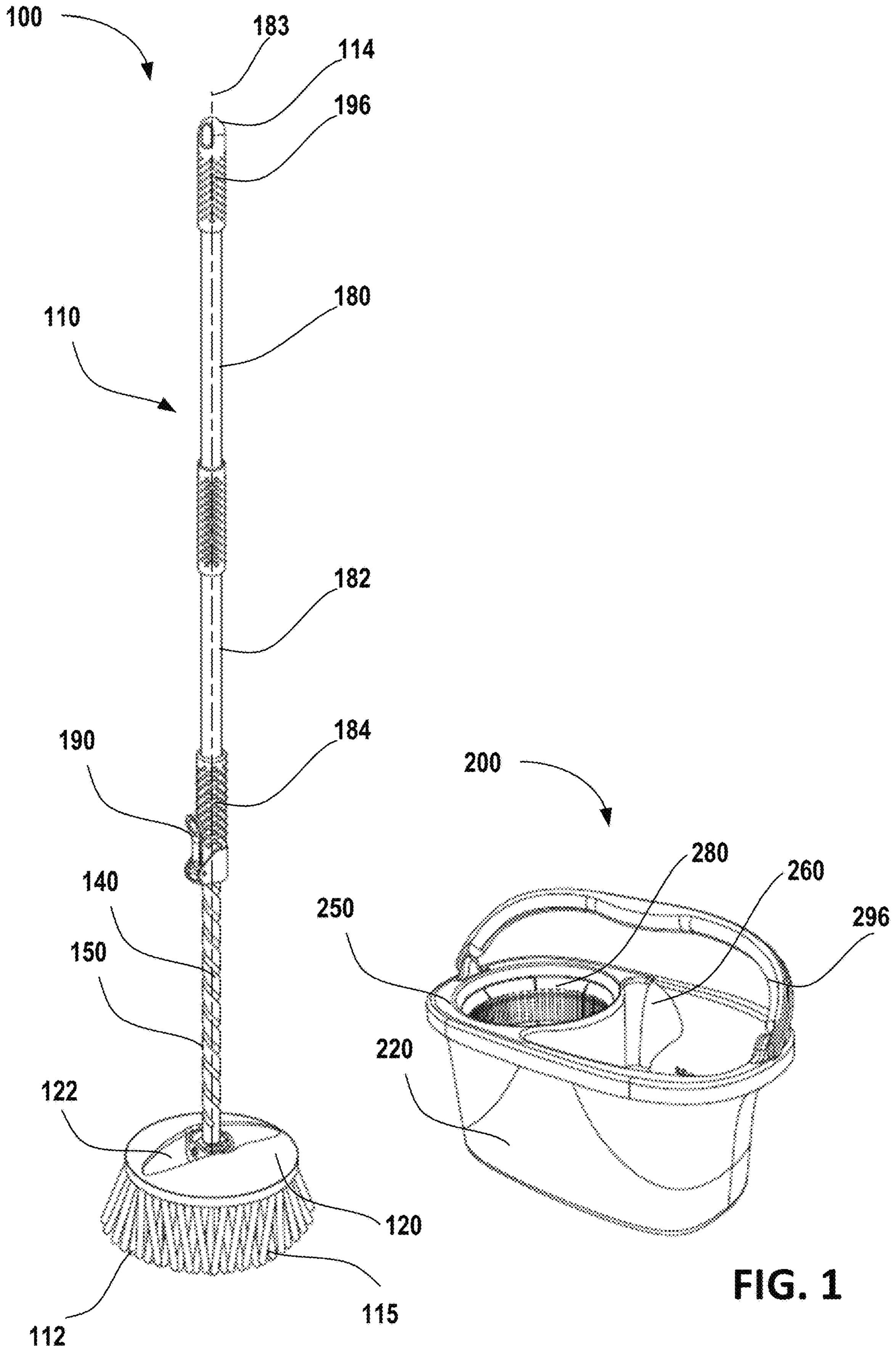
FIG. 1 illustrates a top front perspective view of a mop system according to aspects described herein.

As shown in FIG. 1, the mop system 100 may include a spin mop assembly 110 and a bucket assembly 200, where the spin mop 110 engages a wringer basket 280 of the bucket assembly 200 to dewater a mop head 115. The spin mop 110 may include a mop base 120 that releasably engages a mop head 115 that includes yarns or other cleaning surface(s). The spin mop 110 may have a drive mechanism to cause the mop base 120 and the attached mop head 115 to rotate relative to a handle assembly 180 of the mop 110. The handle assembly 180 may define a handle longitudinal axis 183. The drive mechanism may include a spiral member 140 that is slidably engaged with the handle assembly 180 and pivotally engaged with a swivel member 160. The swivel member 160 may be pivotally engaged with the spiral member 140 and may be positioned between the spiral member 140 and the mop base 120. The bucket assembly 200 may include a bucket 220 to hold a cleaning solution, a bucket handle 296, a wringer basket 280 that is rotatably engaged with an axle member 230 of the bucket 220, and cover 250 that secures to the bucket 220 and helps retain the wringer basket 280 to the bucket assembly 200.

Figure 2A:
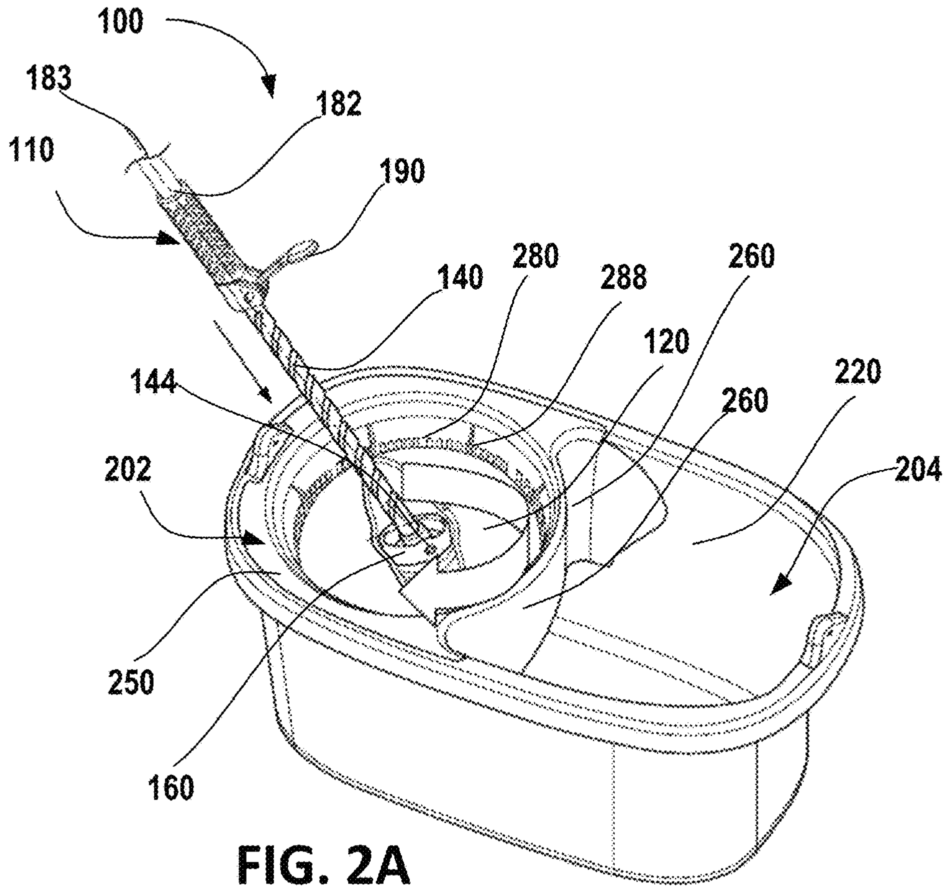
FIGS. 2A-2B illustrates partial perspective views of the mop system of FIG. 1 with a mop assembly engaged with a wringer basket of the bucket according to aspects described herein.
Figure 2B:
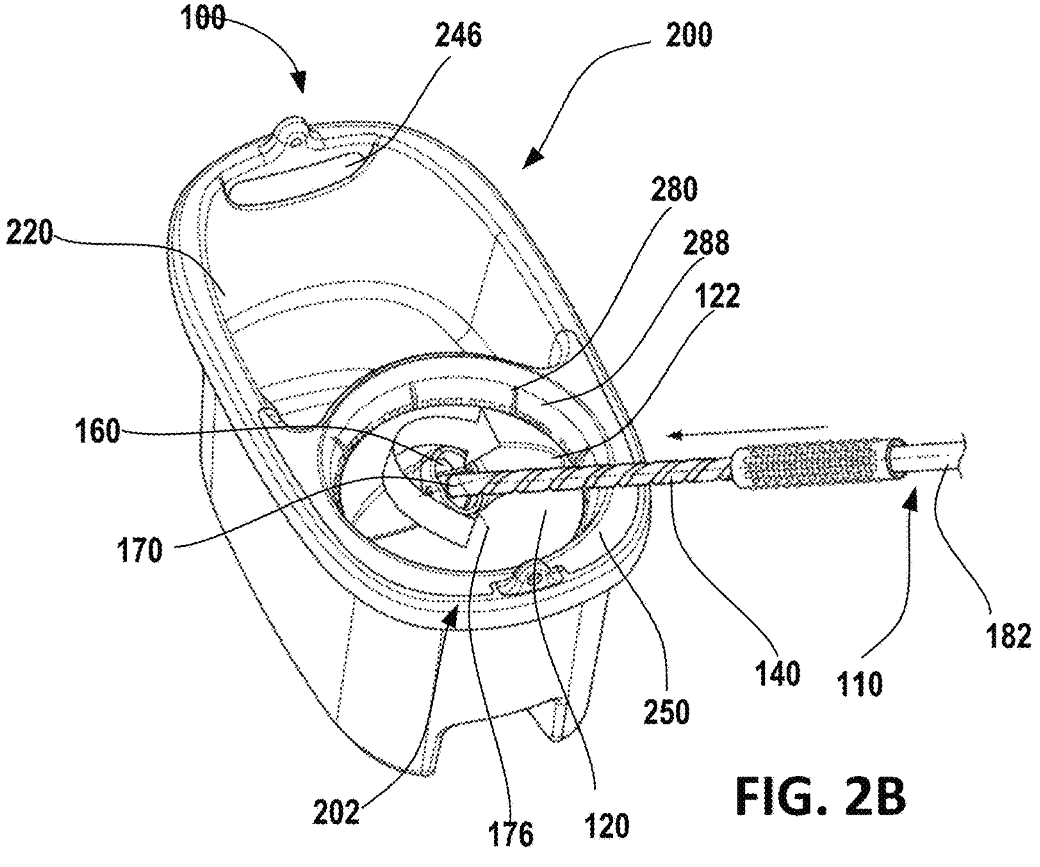
Figure 3:
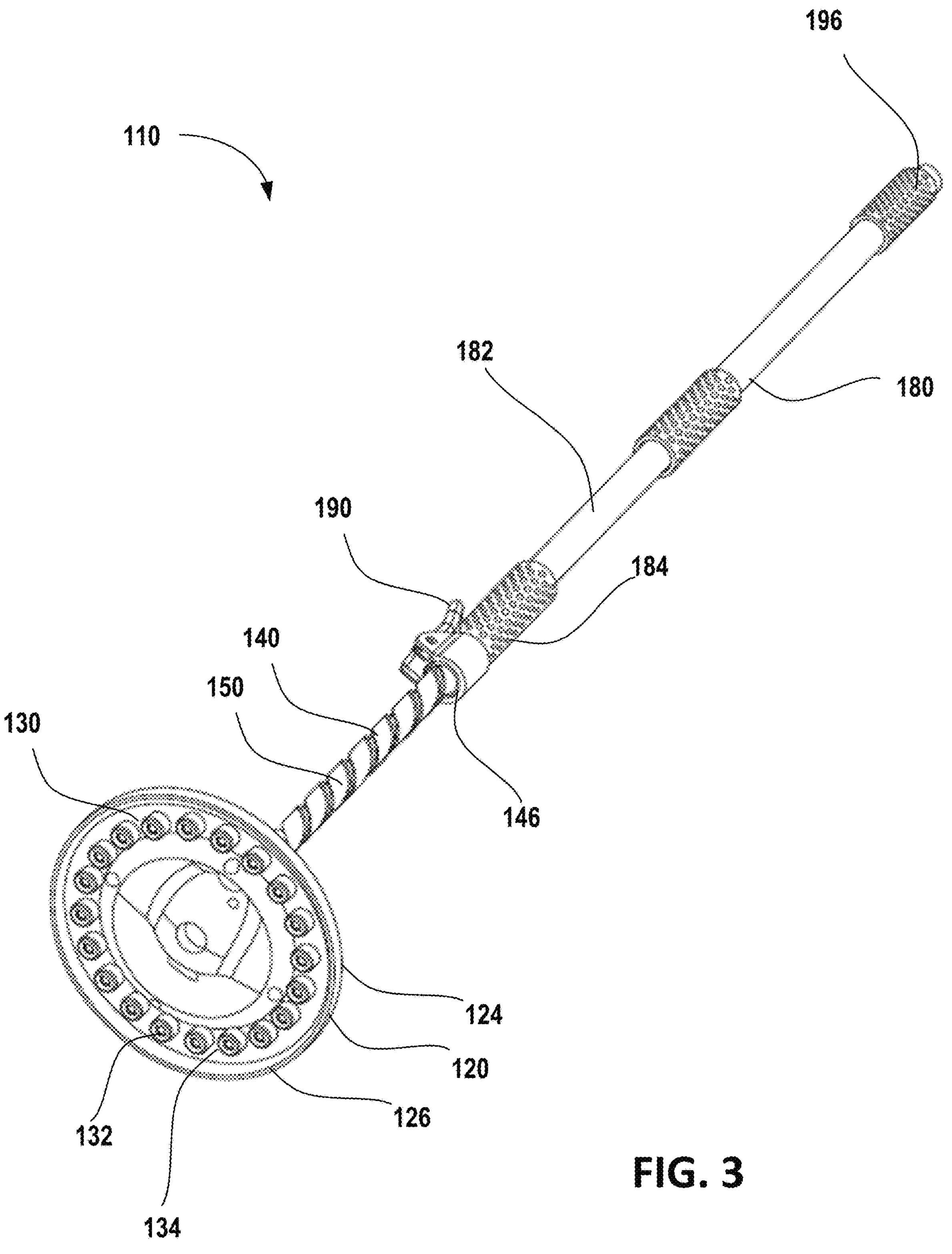
FIG. 3 illustrates a bottom front perspective view of a mop assembly of the mop system of FIG. 1 according to aspects described herein.

After the mop head 115 has been submerged in the cleaning solution contained in the bucket 220, the spin mop 110 may be received in and engage the wringer basket 280 to assist in dewatering the mop head 115 to ensure the mop head 115 has the desired moisture content for the intended cleaning task. The mop head 115 may be placed into the wringer basket 280, where the mop base 120 may engage the wringer basket 280. Once the mop base 120 is received in the wringer basket 280, a lever 190 may be moved (i.e. rotated or lifted) to a released position to release a brake bushing that allows the handle tube 182 of the handle assembly 180 to slidably move along the spiral member 140. A moving bushing within the handle assembly 180 may move along the spiral member 140 causing the spiral member 140 to rotate. The moving bushing may engage the spiral member 140 as the moving bushing is moving downward toward the mop head 115 and may disengage when moving upwards away from the mop head 115 so the rotation of mop head 115 is maintained in one direction. As the spiral member 140 rotates, the spiral member 140 causes the swivel member 160 to rotate, which in turn causes the mop base 120 and the mop head 115 to spin. The spinning of the mop base 120 and mop head 115 then causes the wringer basket 280 to spin in the same direction as the rotation of the mop base 120 creating a centrifugal force to cause any excess cleaning solution, or liquid, to be forced from the yarns of the mop head 115. As shown in FIGS. 2A and 2B, the handle assembly 180 may be positioned at a variety of angles with the mop base 120 and the axle axis 232 of the axle member 230 of the bucket 220 and still be able to drive the rotation of the mop head 115 from multiple angles. For example, the handle assembly 180 may be pivotally rotated about a first swivel axis 170 with a first angle having a range between 0 and 90 degrees from the axle axis 232 and may also be pivotally rotated about the second swivel axis 176 to a second angle within a second angle range of 0 degrees and 61 degrees, while still being able to slide along the spiral member 140 to rotate the mop base 120 and subsequently rotate the wringer basket 280. In some examples, the handle assembly 180 may operate primarily when the handle assembly is pivotally rotated about a first swivel axis with a first angle range of 0 and 45 degrees and where the handle assembly 180 may also concurrently be pivoted about the second swivel axis 176 within a second angle range between a 0 degrees and 45 degrees. In some examples, the second angle range may be between 1 degree and 45 degrees.

The mop assembly 110 may include a first end 112, and a second end 114 opposite the first end 112, where a mop head 115 used for cleaning surfaces is located at the first end 112 and a hanger tip 196 is arranged at the second end 114. The mop head 115 may be releasably connected to the mop base 120 via the frame 130. For example, the frame 130 may have a plurality of receivers 132 arranged along a bottom surface 134 of the frame 130 that may releasably connect to a corresponding member of the mop head 115 to secure the mop head 115 to the mop base 120. These receivers 132 may include a snap-fit connection to allow the mop head 115 to be removed from the mop base 120 after use, such that the mop head 115 may be cleaned or replaced with another mop head 115. Once the mop head 115 has the desired amount of moisture, the handle assembly 180 may be lowered over the spiral member 140 and then locked in place by moving the lever 190 to the locked position.

The mop assembly 110 may include a drive mechanism that allows movement of the handle assembly 180 relative to a spiral member 140 to cause rotation of the mop base 120 relative to the handle assembly 180. The spiral member 140 may include an engaging member 144 at a first end 142, a second end 146 opposite the first end 142, and a central spiraled portion 150 extending between the first end 142 and the second end 146. The spiraled portion 150 may have a spiraled surface that extends a majority of the length of the central spiraled portion 150. The handle assembly 180 may include a handle tube 182, a handle grip 184 near the lower end of the handle tube 182, a lever 190 attached to the handle grip 184. The lever 190 may engage a brake bushing within the handle tube 182, where the lever 190 has a locked positioned that prevents the handle assembly 180 from moving relative to the spiral member 140 and an unlocked position that releases the brake bushing and a sliding bushing (also located within the handle tube 182), which allows the brake bushing and the sliding bushing along with the handle assembly 180 to slide downward on the spiral member 140. The lever 190 may engage the brake bushing by compressing flexible fingers on the brake bushing to prevent the handle tube 182 from moving relative to the spiral member 140. As these components move along the spiraled surface of the spiral member 140, the spiral member 140 rotates causing the mop base 120 to spin.

To dewater the mop head 115, the mop base 120 may engage the wringer basket 280 of the bucket assembly 200 to transmit the rotation of the mop base 120 to cause the rotation of the wringer basket 280. As discussed above, the mop base 120 may be received by the wringer basket 280. The wringer basket 280 may have a plurality of tabs 288 that extend upward and/or inward from a perimeter wall 284 the wringer basket 280 that contact either an outer perimeter surface 124 and/or a chamfered lower outward facing surface 126 of the mop base 120. This contact between the outer perimeter surface 124 and/or the chamfered lower outward facing surface 126 may help the mop base 120. Each tab 288 may have a tapered portion 289 extending near or from an upper edge of the wringer basket 280. The tapered portion 289 of each tab 288 may help to guide the mop base 120 onto a shelf portion 290 of each tab that extends generally perpendicular to the axle axis 232. A plurality of the shelf portions 290 of plurality of tabs 288 may combine to form a generally planar surface to support and engage the mop base 120 when it is received in the wringer basket 280. This engagement may also help the mop base 120 transmit the rotational force to the wringer basket 280. The plurality of tabs 288 may be uniformly spaced apart around the circumference of the basket 280. The plurality tabs 288 may be an even number of tabs 288 (such as the 8 tabs spaced approximately 45 degrees apart from each other in the illustrated example) or may have an odd number of tabs 288 (such as 3 tabs spaced approximately 120 degrees apart). Alternatively, the wringer basket 280 may have any number of tabs 288 and the tabs may not be uniformly spaced.

Figure 4:
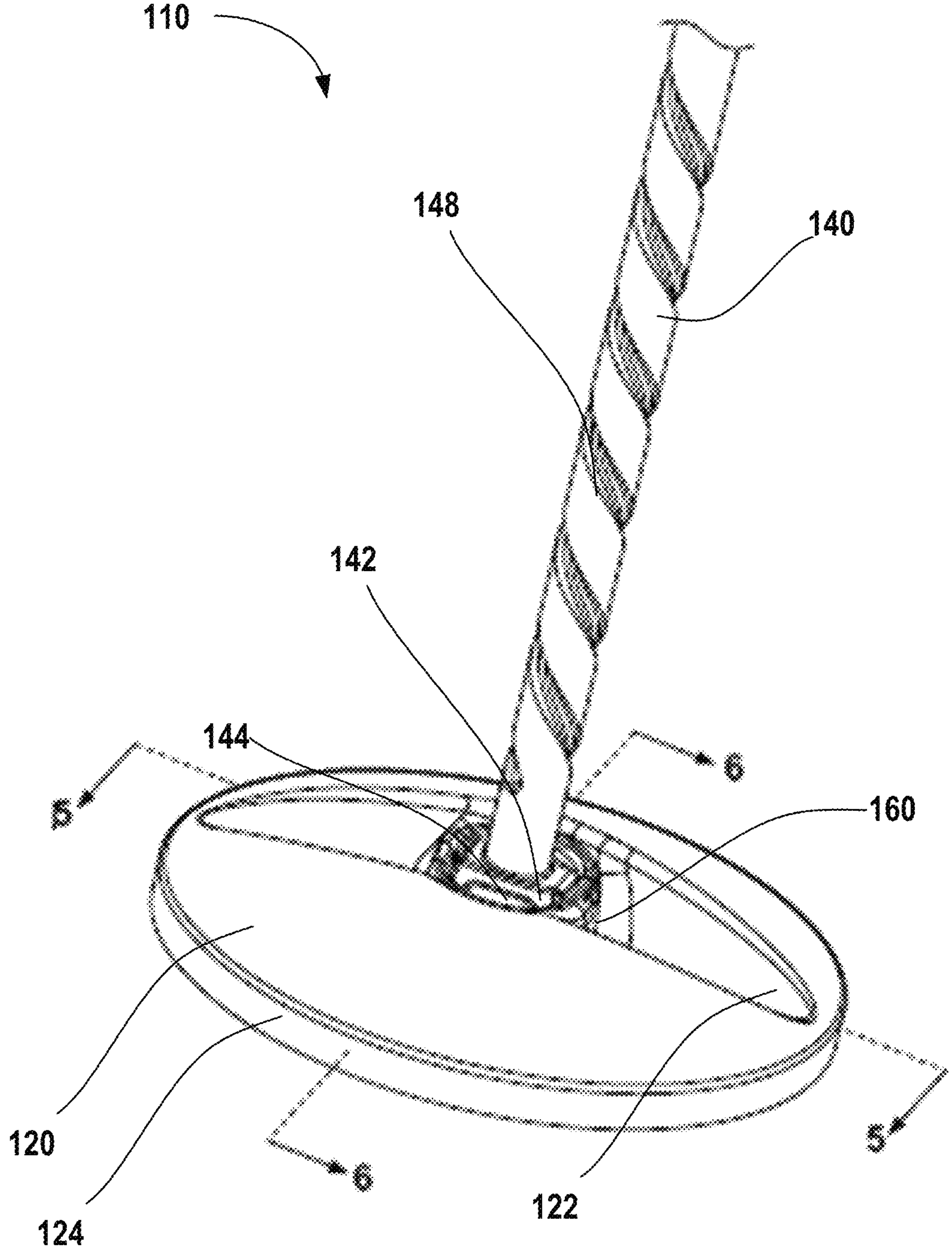
FIG. 4 illustrates an partial top perspective view of the mop of FIG. 3 according to aspects described herein.
Figure 5:
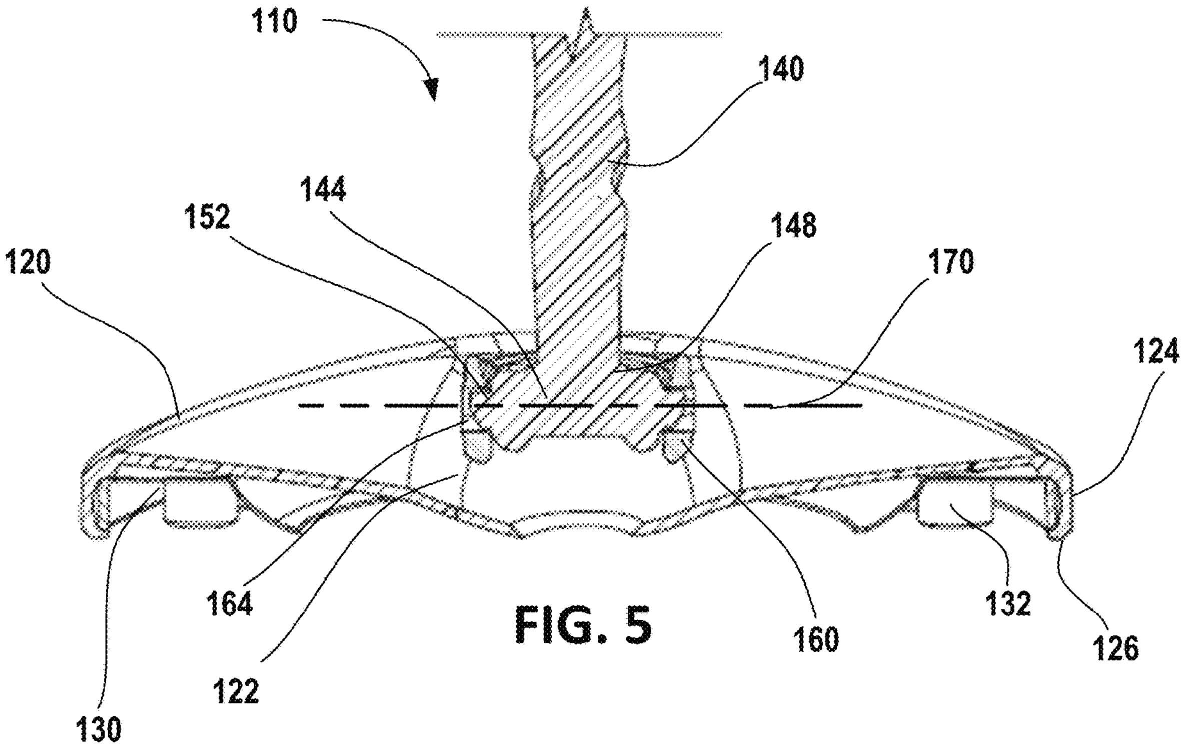
FIG. 5 illustrates a cross-sectional side view of a portion of the mop of FIG. 4 according to aspects described herein.
Figure 6:
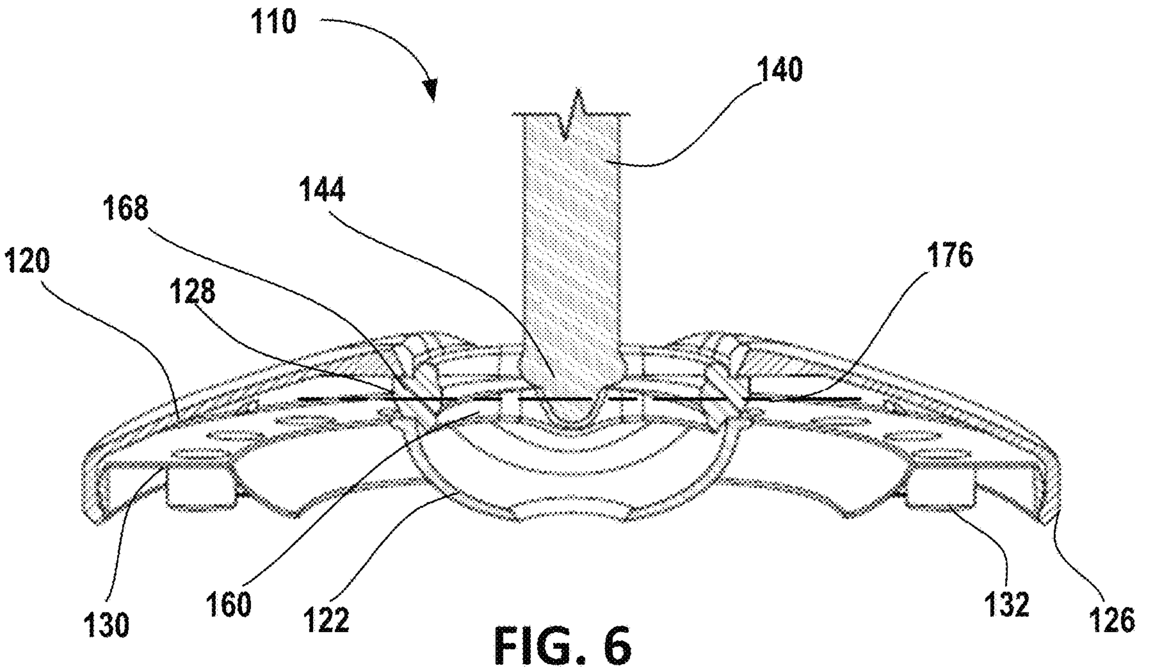
FIG. 6 illustrates a cross-sectional side view of a portion of the mop of FIG. 4 according to aspects described herein.
Figures 7, 8:
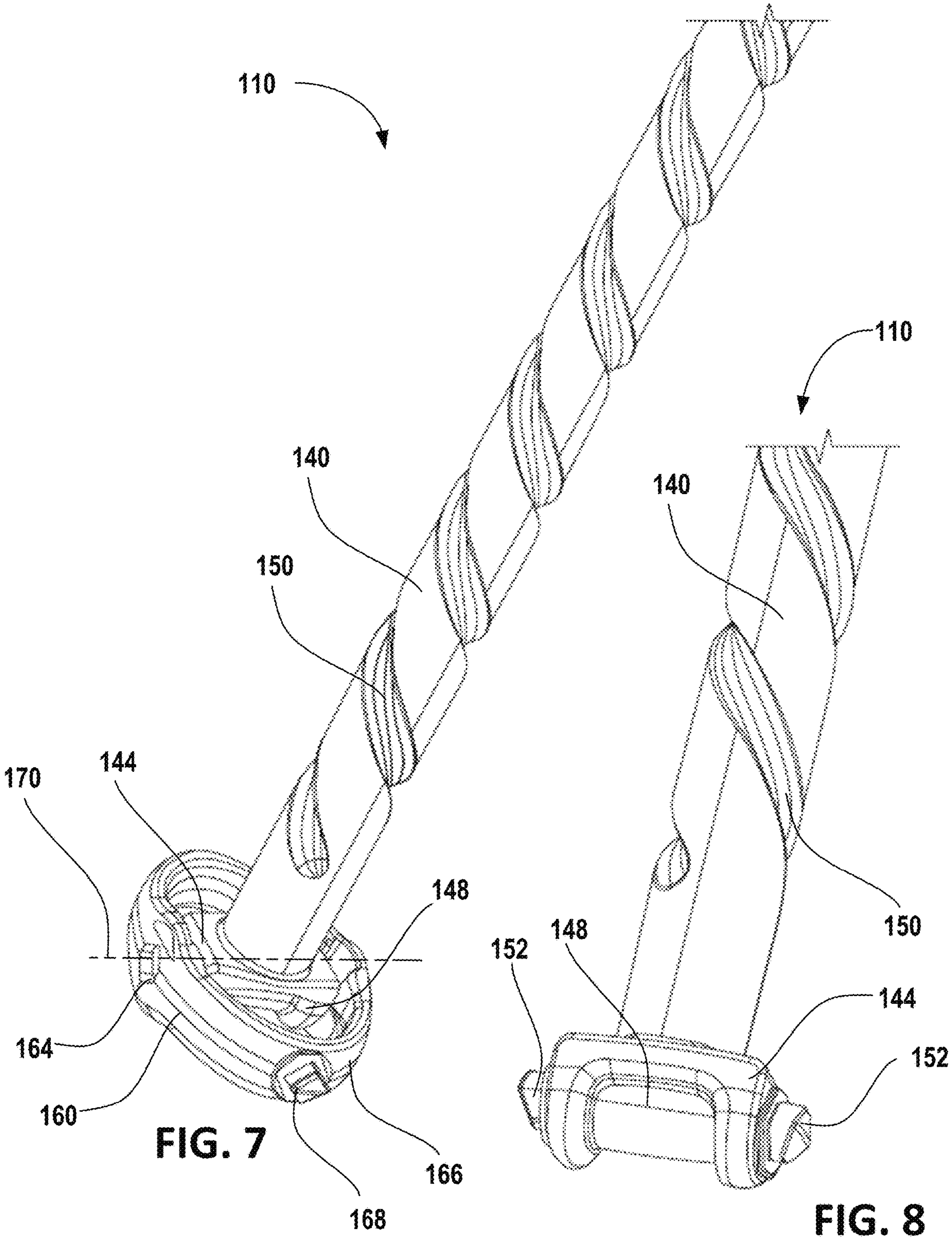
FIG. 7 illustrates a partial perspective view of a portion of the mop of FIG. 3 with some components removed for clarity according to aspects described herein.
FIG. 8 illustrates a partial perspective view of a spiral member of the mop of FIG. 3 according to aspects described herein.
Figure 9:
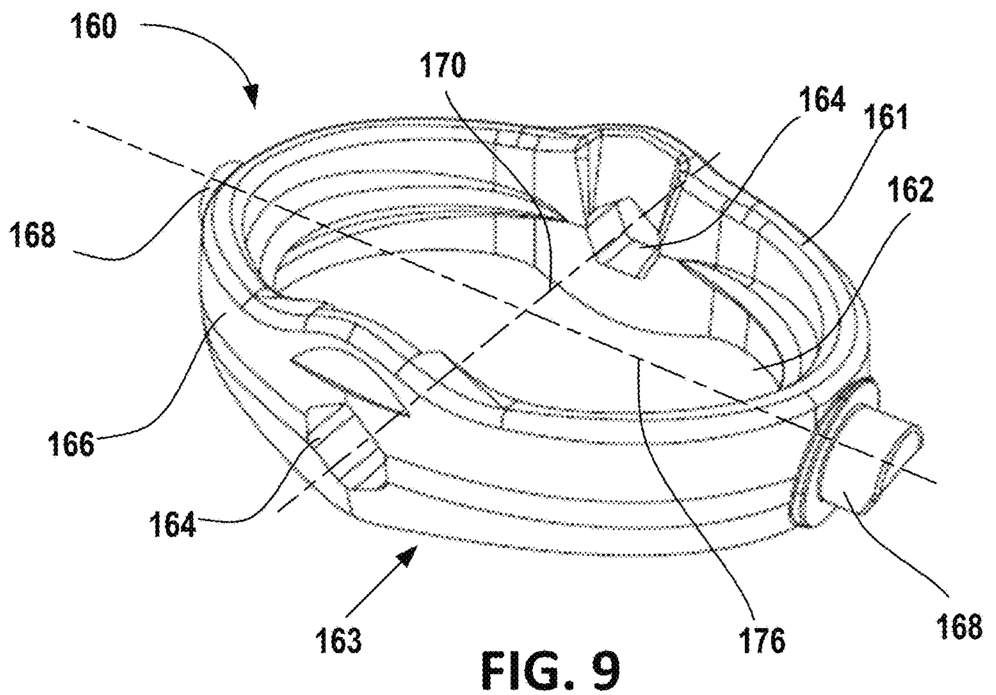
FIG. 9 illustrates a perspective view of a swivel member of the mop of FIG. 3 according to aspects described herein.
Figure 10:
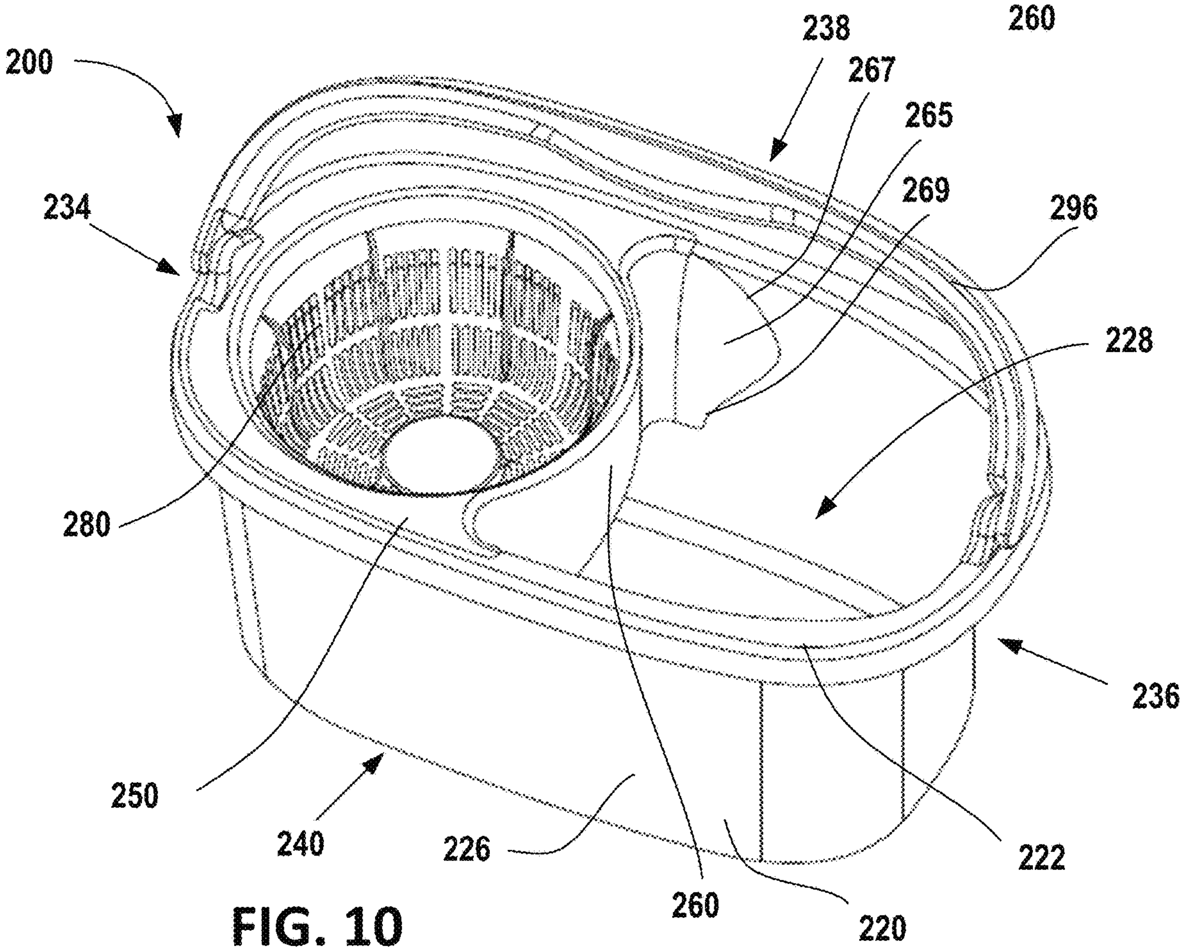
FIG. 10 illustrates a front top perspective view of a bucket assembly of the mop system of FIG. 1 according to aspects described herein.
Figure 11:
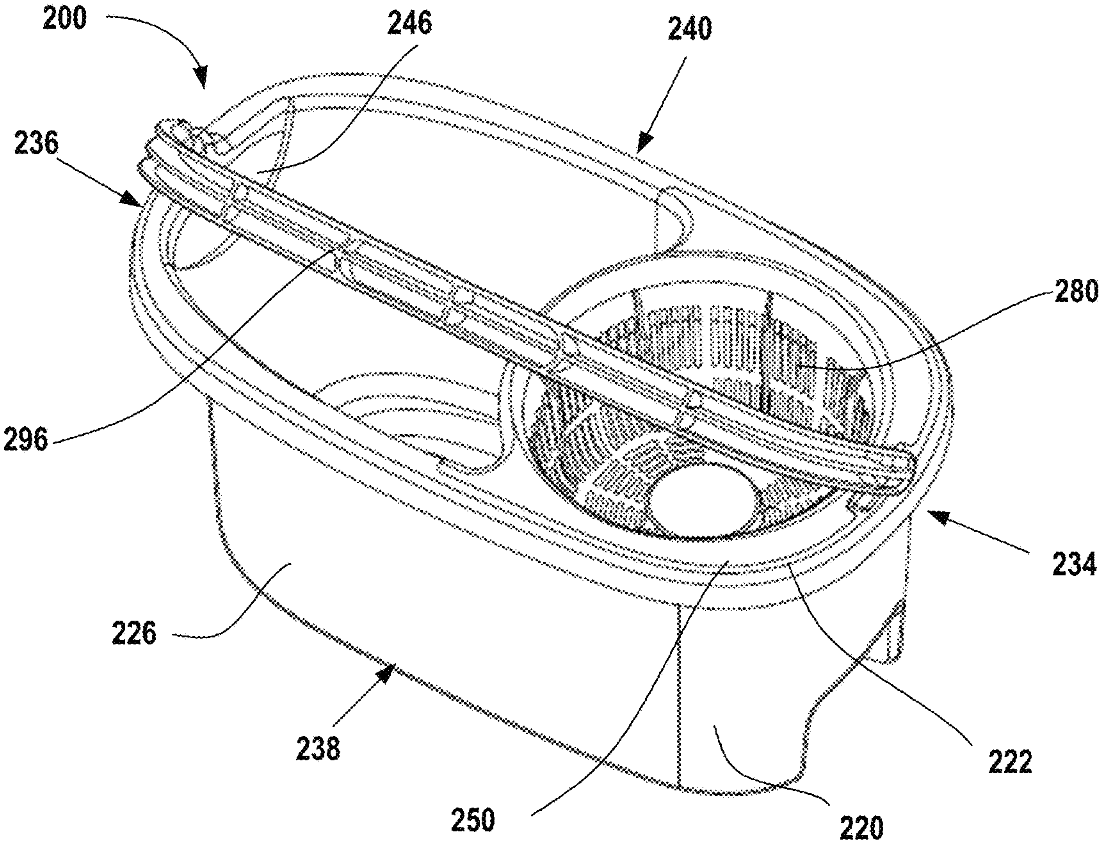
FIG. 11 illustrates a rear top perspective view of the bucket assembly of FIG. 10 according to aspects described herein.
Figure 12:
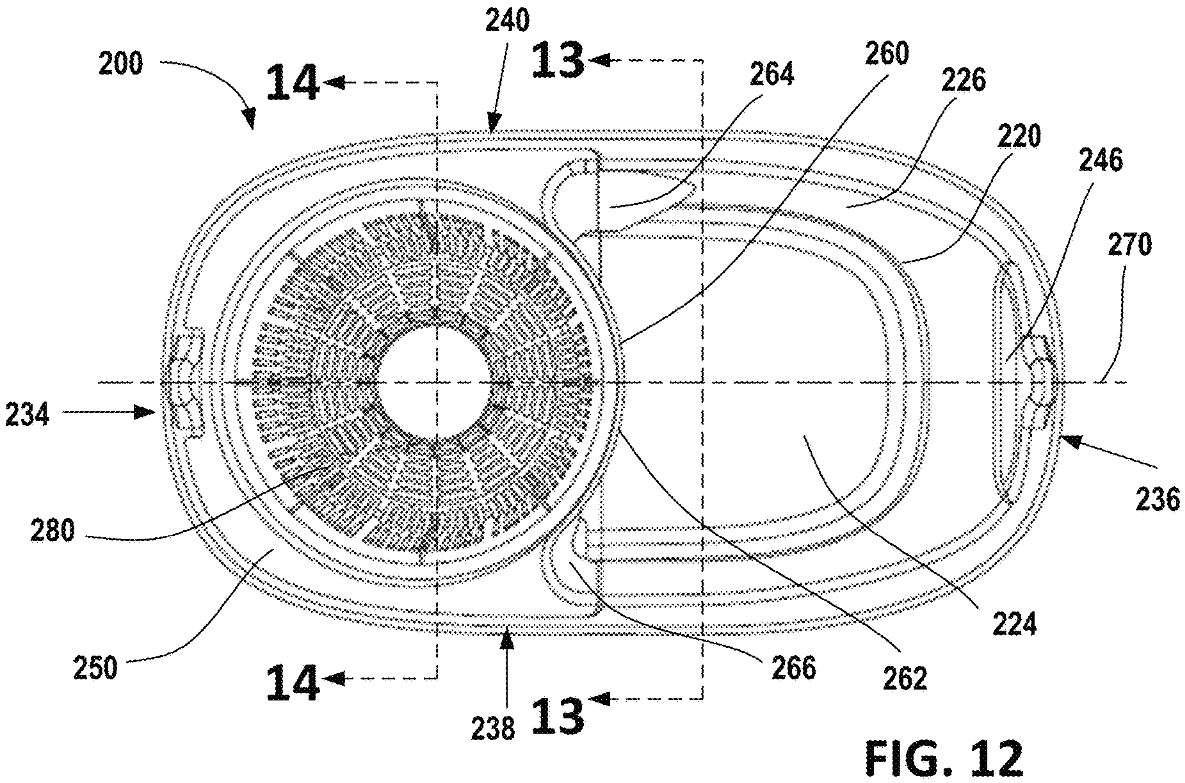
FIG. 12 illustrates a top view of the bucket assembly of FIG. 10 according to aspects described herein.
Figure 13:
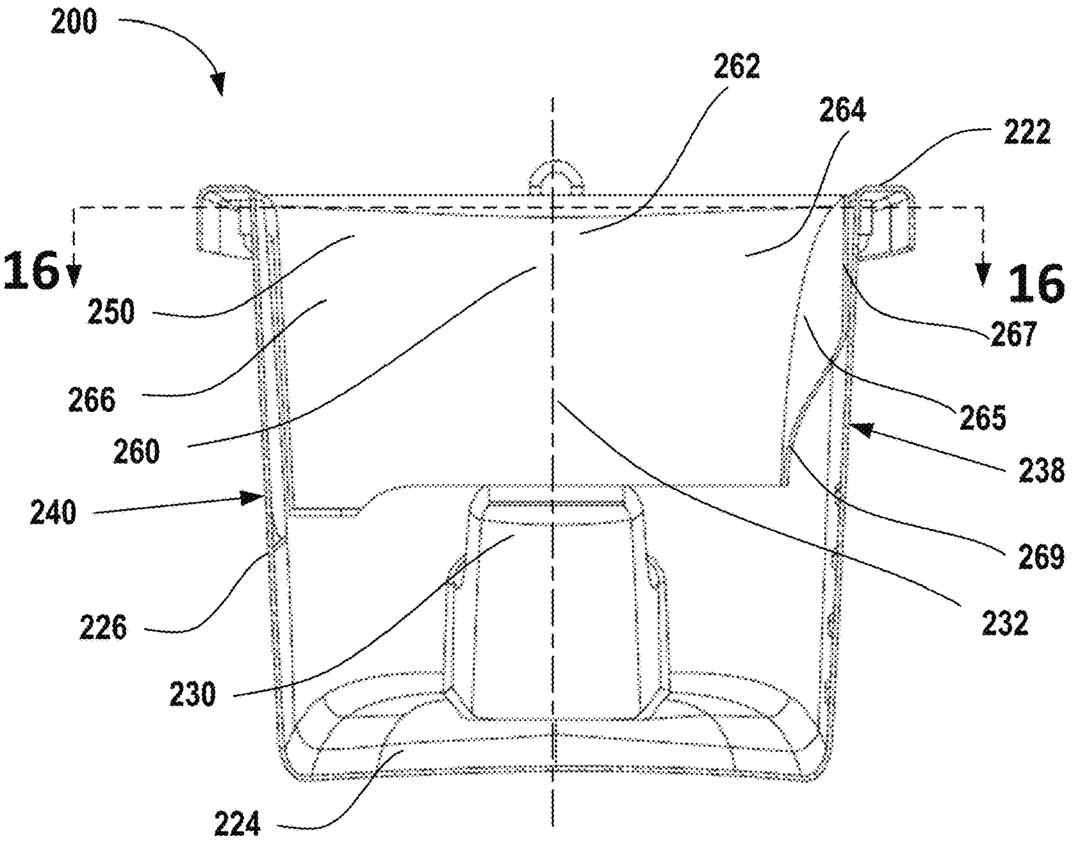
FIG. 13 illustrates a side cross-sectional view of the bucket assembly along line 13-13 shown in FIG. 12 according to aspects described herein.
Figure 14:
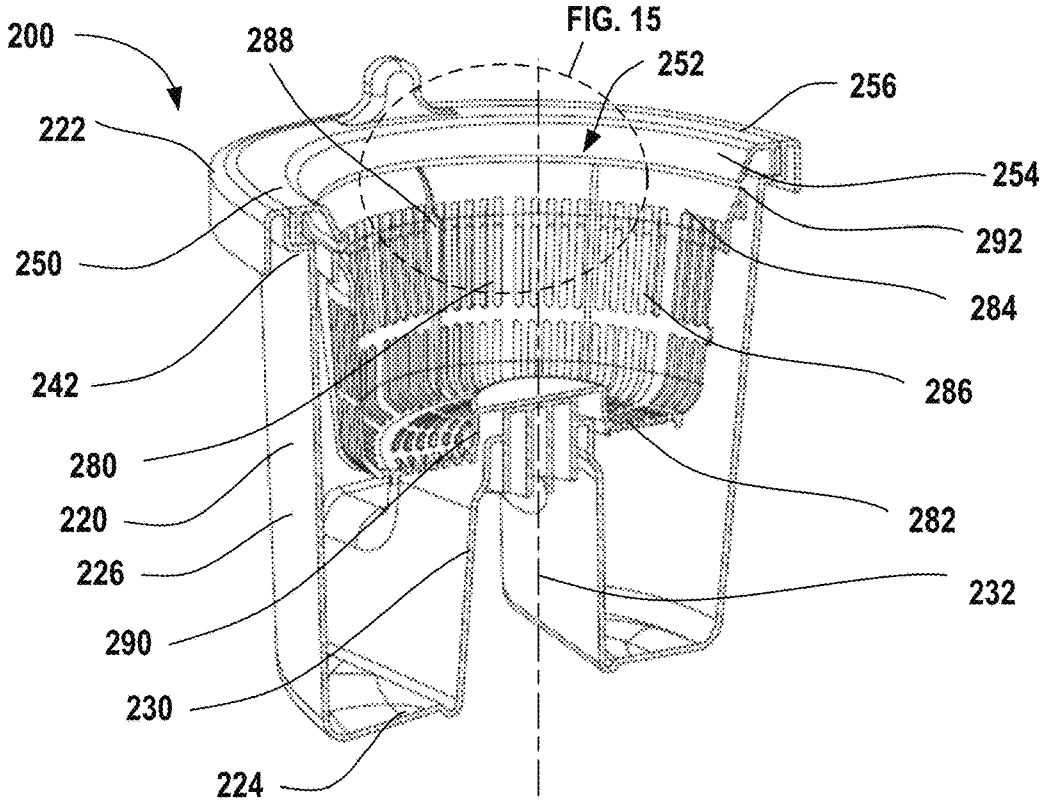
FIG. 14 illustrates a perspective cross-sectional view of the bucket assembly along line 14-14 shown in FIG. 12 according to aspects described herein.
Figure 15:
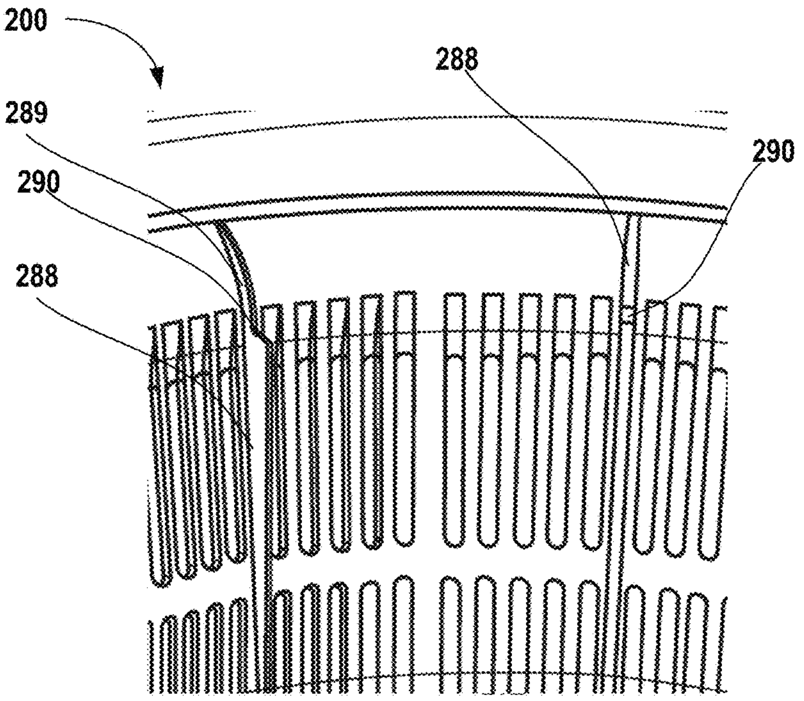
FIG. 15 illustrates an enlarged view of the bucket assembly of FIG. 14 according to aspects described herein.
Figure 16:
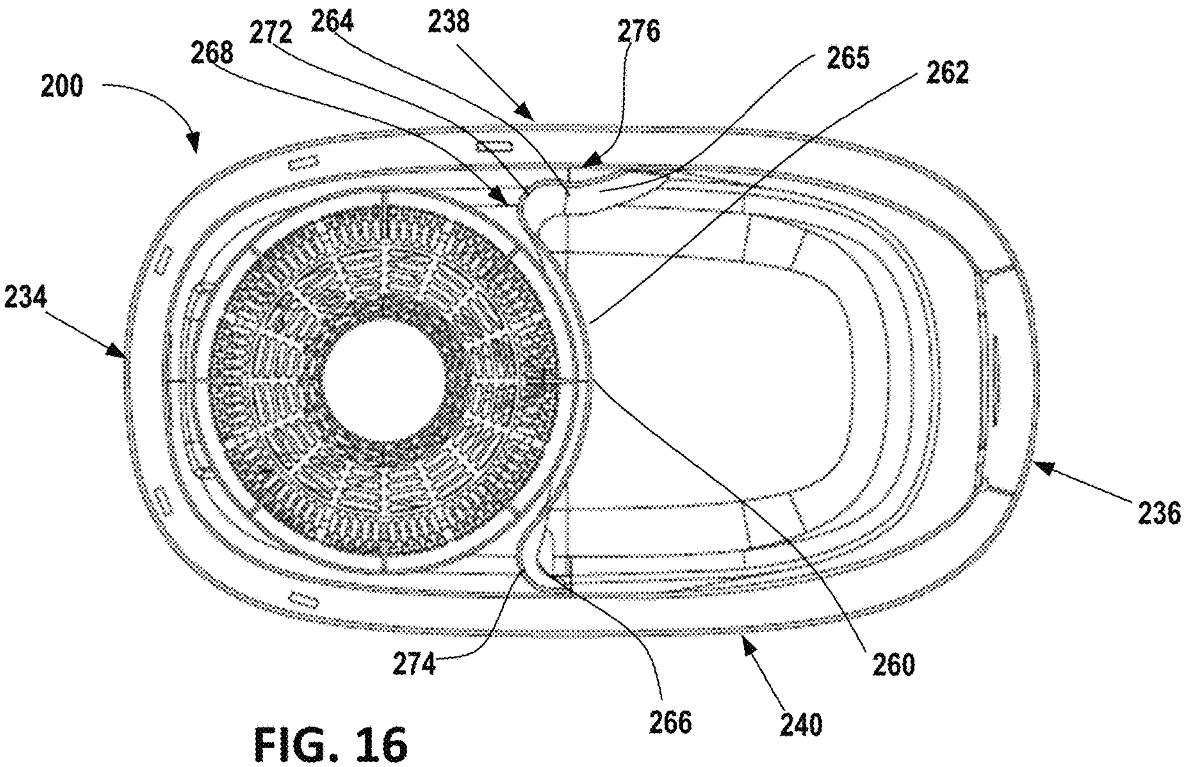
FIG. 16 illustrates a top cross-sectional view of the bucket assembly along line 16-16 of FIG. 13 according to aspects described herein.

FIGS. 4-6 illustrate a portion of the mop 110 focusing on the articulating joint of the mop base 120 relative to the spiral member 140. The mop base 120 may articulate about two different axes while still allowing the handle assembly 180 to drive rotation of the mop base 120. The spiral member 140 includes an engaging member 144, where the engaging member may have a body member 148 with a width greater than the spiraled portion 150 of the spiral member 140, which may act as a stop for the handle assembly 180 when the handle assembly 180 moves toward the mop base 120. The body member may include a boss 152 that extends from opposite ends of the body member 148. The body member 148 of the engaging member 144 may be received in a central aperture 162 of the swivel member 160 where each boss 152 may be inserted into a corresponding opening 164 that are arranged opposite each other on a perimeter surface 166 of the swivel member 160. As shown in FIG. 5, when the engaging member 144 is connected to the swivel member 160, the bosses 152 may align with a first swivel axis 170. As such, the engaging member 144 may be pivotally connected to the swivel member 160 to rotate about the first swivel axis 170 that is defined by the openings 164. As shown in FIGS. 6, 7, and 9, the swivel member 160 may be generally oval shaped have a top surface 161, a bottom surface 163, and convex shaped perimeter surface 166 extending between the top and bottom surfaces 161, 163. A pair of swivel bosses 168 may be arranged on opposite ends of the perimeter surface 166. The bosses 168 may define a second swivel axis 176 that may extend in a direction generally perpendicular to the first swivel axis 170. In some examples, the second swivel axis 176 may be arranged at an angle that is not generally perpendicular but different from the first swivel axis 170. Each boss 168 may be inserted into a corresponding opening 128 of the mop base 120 to pivotally connect the swivel member 160 to the mop base 120 around the second swivel axis 176. In addition, mop base 120 may have a recess 122 with a generally curved concave shaped surface to allow the swivel member 160 to move within the recess 122. The handle assembly 180 may be slidably connected to and arranged in a collinear fashion with the spiral member 140. The handle assembly 180 may slide over the spiral member 140 such that the spiral member is inside the handle assembly 180. The two pivotally connected members 140, 160 allow the handle assembly 180 to be rotated along both axes 170, 176 at the same time while still allowing movement of the handle assembly 180 along the spiral member 140 to drive the rotation of the mop base 120 around the axle axis 232.

As discussed above, the movement of the handle assembly 180 along the spiral member 140 causes the mop base 120 to rotate which in turn rotates the mop head and wringer basket 280 to rotate in the same direction as the mop base 120. As a wet mop head is spun inside the wringer basket 280, the water is forced from the wet mop head 115 into the bucket assembly 200. As the water is flung from the wet mop head 115, the water may contact the rear surface of splashguard 260 of the cover 250 and then fall into the bucket 220. As will be discussed in more detail below, the splashguard 260 of the cover 250 may be uniquely shaped to prevent water from splashing out of the bucket assembly 200.

As shown in FIGS. 10-17, the bucket assembly 200 may be partitioned into a wringer region 202 and a storage portion 204, and may include a bucket 220, a cover 250, a wringer basket 280, and a handle 296. The bucket 220 may have an elongated shape that includes a top wall 222, a bottom wall 224 opposite the top wall 222, and a sidewall 226 extending between the top wall 222 and the bottom wall 224. The sidewall 226 and bottom wall 224 may create a cavity 228 for holding a substance (i.e. a cleaning solution or other liquid material). In some examples, elongated shape of the bucket may include a length that is greater than a width, where the length extends from a first side 234 to a second side 236 opposite the first side 234 and the width extends from a third side 238 to a fourth side 240 opposite the third side 238. The wringer region 202 may include the wringer basket 280 and cover 250 that are arranged nearer the first side 234, while the storage portion 204 that is configured to hold the majority of the liquid is nearer the second side 236. A handle 296 may be rotatably connected to the top wall 222 at the first side 234 and the second side 236 to provide a user an easy means to carry the bucket assembly 200.

In the wringer region 202, the wringer basket 280 may be rotationally engaged with an axle member 230 of the bucket 220, such that the wringer basket 280 is free to spin on the axle member 230 of the bucket 220. The axle member 230 may extend from the bottom wall 224 and define an axle axis 232. In some examples, the axle axis 232 may be vertically oriented or generally perpendicular with the bottom wall 224. The wringer basket 280 may have a bottom wall 282, a perimeter wall 284 extending upward from the bottom wall 282, with a plurality of tabs 288 extending from the perimeter wall 284. The walls 282, 284 may have a plurality of openings 286 extending through the walls 282, 284 that allow water to pass through the openings 286. The openings 286 may be elongated with a height greater than a width.

The wringer basket 280 may include a receiver 294 on the bottom wall 282 that rotationally engages the axle member 230 to allow the wringer basket 280 to freely rotate around axle axis 232. The wringer basket 280 may be secured to the bucket assembly 200 by cover 250, where the cover 250 is mounted onto a shelf 242 that extends along the first side 234, a portion of the third side 238, and a portion of the fourth side 240 of the bucket assembly 200. The shelf 242 may be positioned below the top wall 222 and have a plurality of locking features 244 (i.e. pockets and raised protrusions) that engage with corresponding locking features on the underside of the cover 250 to secure the cover 250 to the bucket 220. The cover 250 may have a central opening 252 with a flange 254 that extends downward from a top surface 256 of the cover 250. The flange 254 may overlap with an outer edge 292 of the wringer basket 280 causing the central opening 252 to have a width that is smaller than a width of the outer edge 292 of the wringer basket 280.

Figure 17:
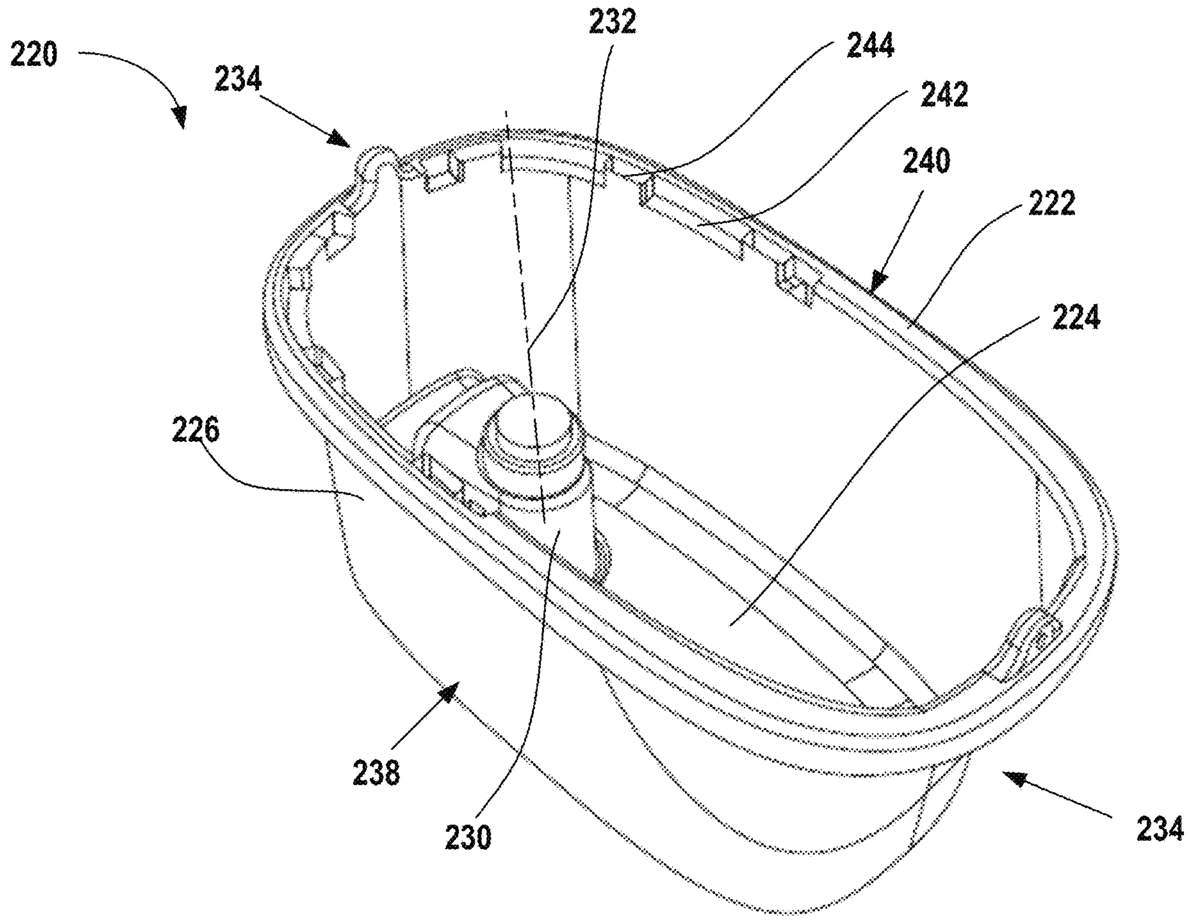
FIG. 17 illustrates a perspective view of the bucket of the bucket assembly of FIG. 10 according to aspects described herein.

The cover 250 may also include splashguard 260 that extends downward from the top surface 256 toward the bottom wall 224 and may serve as a partition between the wringer region 202 and the storage portion 204. The splashguard may help to create a collection region 268 around the wringer basket 280 to prevent liquid from escaping the bucket assembly 200 while the wringer basket 280 is spinning. While the top surface 256 of the cover 250 may extend over this collection region 268 helps to prevent liquid from escaping. The splashguard 260 may have an asymmetrical shape with respect to a plane 270 defined by an intersection of axle axis 232 and the center line of the bucket base (i.e. a longitudinal axis extending from a center of the first side 234 and a center of the second side 236). The splashguard 260 may have a central region 262 that has a curved shape that may be coaxial with axle axis 232. The curved shape of the central region 262 may be a convex shape. The splashguard 260 may also have a first end region 264 and a second end region 266 that extend from the central region 262 opposite the first end region 264, where each end region 264, 266 that extends both toward the second side 236 of the bucket 220 and also outward from the central convex region 262 to the sidewall 226 on the third side 238 and fourth side 240 respectively. The first end region 264 may have a different shape than the second end region 266. As shown in FIG. 17, the first end region 264 may have a smaller radius 272 in the corner as it transitions from the central convex region 262 than radius 274 in the corner of the transition between the central convex region 262 and the second end region 266. In addition, first end region 264 may have an extended wall 265 that creates a narrow cavity 276 within the collection region 268 that extends toward the second side 236 of the bucket assembly 200 to improve the splashguard's retention of expelled liquid. An upper side edge 267 of the extended wall 265 may contact an inner surface of the sidewall 226 to prevent liquid from escaping while a lower edge 269 of the extended wall 265 may be offset from the inner surface of the sidewall 226 to allow liquid to fall into the storage portion 204 of the bucket assembly 200. The first end region 264 may extend further toward the second side 236 than the second end region 266 (i.e. the extended wall 265 has an end point further from the axle axis 232 than an end point of the second end region 266). The splashguard 260 may extend at least 50 percent of a height of the bucket 220, where the height of the bucket assembly may be defined as a distance from a bottom surface of the bottom wall to a top surface of the top wall.

The unique shape of the splashguard 260 may be arranged to stop any water droplets expelled from the wringer basket 280 that may be propelled toward the storage portion 204. For instance, in the illustrated examples, the wringer basket 280 may rotate in a clockwise direction (as viewed in a top view shown in FIG. 12). As the wringer basket 280 rotates, the expelled water is directed toward a quadrant of the bucket near both the second side 236 and the third side 238 of the bucket assembly 200. The first end region 264 with its extended wall 265 may help to catch any liquid expelled from the mop head 115 and allow it to drip down the splashguard 260 and into the storage portion 204.

As another feature of the bucket 220, the sidewall 226 may have a pour spout 246 arranged at the second side 236 of the bucket 220. The pour spout 246 may have be located below the top wall 222 of the bucket base and allow a user to easily tilt the bucket assembly 200 to pour out any cleaning solution (or water) from the bucket assembly 200. The sidewall 226 may have a tapered shape to act as a funnel to assist the flow of water through the spout 246.

The various components of the mop system 100 such as the mop base 120, the spiral member 140, the swivel member 160, the components of the handle assembly 180, the bucket 220, the cover 250, the wringer basket 280, and the handle 296 may be formed from a non-metallic material, such as a polymeric material, using a molding, forming, cutting, or other process known to one skilled in the art. Optionally or alternatively, any or all of these components may be formed from a metallic material.

Aspects of the disclosure have been described in terms of illustrative examples thereof. Numerous other examples, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A spin mop comprising:

a handle assembly having a handle tube slidably engaged with a spiral member;

a swivel member pivotally attached to the spiral member along a first swivel axis; and a mop base configured to releasably secure a mop head, wherein the mop base is pivotally attached to the swivel member along a second swivel axis, wherein the first swivel axis and the second swivel axis are perpendicular to each other, and wherein the swivel member is received in a recess in a top surface of the mop base such that the swivel member is movable within the recess;

wherein a movement of the handle assembly sliding along the spiral member causes the mop head to rotate;

wherein the spiral member includes an engaging member that is pivotally connected to the swivel member;

wherein the engaging member has a first boss and a second boss opposite the first boss, wherein the first boss is received in a first opening of the swivel member and the second boss is received in a second opening of the swivel member; and wherein the first boss and the second boss are arranged along the first swivel axis.

2. The spin mop of claim 1, wherein the swivel member has a central aperture that receives the engaging member of the spiral member.

3. The spin mop of claim 1, wherein the swivel member has a first swivel boss and a second swivel boss, wherein the first swivel boss is received in a first opening of the mop base, and the second swivel boss is received in a second opening of the mop base, wherein the first swivel boss and the second swivel boss are arranged along the second swivel axis.

4. The spin mop of claim 1, wherein the swivel member includes a top surface, a bottom surface, and a perimeter surface extending between the top surface and the bottom surface.

5. The spin mop of claim 4, wherein the perimeter surface of the swivel member has a convex shape between the top surface and the bottom surface.

6. The spin mop of claim 1, wherein the handle assembly defines a longitudinal axis, wherein the first swivel axis is generally perpendicular to the longitudinal axis.

7. A spin mop system comprising:

a bucket assembly comprising:

a bucket including a top wall, a bottom wall, and a sidewall extending between the top wall and the bottom wall, an axle member connected to the bottom wall, and a shelf positioned below the top wall; the axle member defining an axle axis;

a wringer basket rotatably engaged with the bucket along the axle axis, the wringer basket including a bottom wall, a perimeter wall extending upward from the bottom wall, a recess in the bottom wall that receives the axle member, and a plurality of wringer basket tabs extending inward from the perimeter wall, wherein the perimeter wall and the bottom wall have a plurality of openings that allow a liquid to pass through the plurality of openings;

a cover secured to the shelf, wherein the cover includes a top surface, a central opening that is located over the wringer basket, and a splashguard that extends downward from the top surface;

wherein the bucket has an elongated shape that includes a length that is greater than a width, wherein the length extends from a first side to a second side opposite the first side, and the width extends from a third side to a fourth side opposite the third side, wherein the wringer basket is nearer the first side than the second side; and wherein the splashguard of the cover is asymmetrical with respect to a plane that extends through the axle axis and a centerline of the bucket that extends in a direction from a center of the first side to a center of the second side; and a spin mop comprising:

a handle assembly with a drive mechanism that causes a mop head to rotate relative to the handle assembly.

8. The spin mop system of claim 7, wherein when the mop head is received in the wringer basket of the bucket assembly, a rotation of the mop head to spin causes the wringer basket to rotate about the axle axis.

9. The spin mop system of claim 7, wherein the splashguard of the cover extends downward more than 50 percent of a height of the bucket assembly, wherein the height of the bucket assembly is defined as a distance from a bottom surface of the bottom wall of the bucket to a top surface of the top wall of the bucket.

10. The spin mop system of claim 7, wherein the bucket includes a pour spout positioned within the sidewall nearer the second side than the first side.

11. The spin mop system of claim 7, wherein the splashguard includes a central region that has a curved shape that is coaxial with the axle axis, a first end region extending from the central region towards the second side of the bucket, and a second end region extending from the central region towards the second side opposite the first end region, wherein the first end region extends closer to the second side than the second end region.

12. The spin mop system of claim 11, wherein the central region has a convex shape.

13. A bucket assembly for a spin mop system comprising:

a bucket including a top wall, a bottom wall, and a side wall extending between the top wall and the bottom wall, an axle member connected to the bottom wall, and a shelf positioned below the top wall; the axle member defining an axle axis, wherein the bucket has an elongated shape that includes a length that is greater than a width, wherein the length extends from a first side to a second side opposite the first side, and the width extends from a third side to a fourth side opposite the third side, a wringer basket rotatably engaged with the bucket along the axle axis, the wringer basket including a bottom wall, a perimeter wall extending upward from the bottom wall, a recess in the bottom wall that receives the axle member, and a plurality of wringer basket tabs extending inward from the perimeter wall, wherein the perimeter wall and the bottom wall have a plurality of openings that allow a liquid to pass through the plurality of openings; wherein the wringer basket is nearer the first side than the second side; and a cover secured to the shelf, wherein the cover includes a top surface, a central opening that is located over the wringer basket, and a splashguard that extends downward from the top surface; and wherein the splashguard of the cover is asymmetrical with respect to a plane that extends through the axle axis and a centerline of the bucket that extends in a direction from a center of the first side to a center of the second side.

14. The bucket assembly for a spin mop system of claim 13, wherein the splashguard includes a central region that has a curved shape that is coaxial with the axle axis, a first end region extending from the central region towards the second side of the bucket, and a second end region extending from the central region towards the second side opposite the first end region, wherein the first end region extends closer to the second side than the second end region.

15. The bucket assembly for a spin mop system of claim 14, wherein the central region has a convex shape.

16. The bucket assembly for a spin mop system of claim 13, wherein the bucket includes a pour spout positioned within the side wall nearer the second side than the first side.

17. The bucket assembly for a spin mop system of claim 13, wherein when a mop head from a spin mop is received in the wringer basket of the bucket assembly, a rotation of the mop head causes the wringer basket to rotate about the axle axis.

18. The bucket assembly for a spin mop system of claim 13, wherein the splashguard of the cover extends downward more than 50 percent of a height of the bucket assembly, wherein the height of the bucket assembly is defined as a distance from a bottom surface of the bottom wall of the bucket to a top surface of the top wall of the bucket.

* * * * *